United States Patent [19]

Festag et al.

[11] 4,289,009
[45] Sep. 15, 1981

[54] PROCESS AND DEVICE FOR THE MANUFACTURE OF BLISTERS WITH HIGH BARRIER PROPERTIES

[75] Inventors: Werner Festag; Hans-Ueli Müller, both of Schaffhausen, Switzerland

[73] Assignee: Swiss Aluminium Ltd., Chippis, Switzerland

[21] Appl. No.: 40,980

[22] Filed: May 21, 1979

[30] Foreign Application Priority Data

Jun. 2, 1978 [CH] Switzerland .................. 6065/78

[51] Int. Cl.³ ........................................... B21D 22/00
[52] U.S. Cl. ........................................ 72/60; 72/350
[58] Field of Search ............. 72/41, 350, 351, 57, 72/60, 347, 460

[56] References Cited

U.S. PATENT DOCUMENTS

| 3,664,172 | 5/1972 | Cvacho | 72/350 |
| 4,045,986 | 9/1977 | Laycock | 72/60 |

FOREIGN PATENT DOCUMENTS 68377 of 1941 Czechoslovakia .................. 72/350

*Primary Examiner*—Leon Gilden
*Attorney, Agent, or Firm*—Bachman and LaPointe

[57] ABSTRACT

The invention concerns a process and a device for manufacturing blisters with high barrier properties from a metal-plastic composite foil which can be deep drawn, in particular from an aluminum-plastic composite foil which is held fast in the clamping facility of a device for manufacturing blisters. In shaping the foil into one or more blisters, pressure is applied pneumatically or pneumatically and hydraulically to at least one side of the foil which stretches onto and over a lubricating layer or easy slip plate on the base of a die.

16 Claims, 8 Drawing Figures

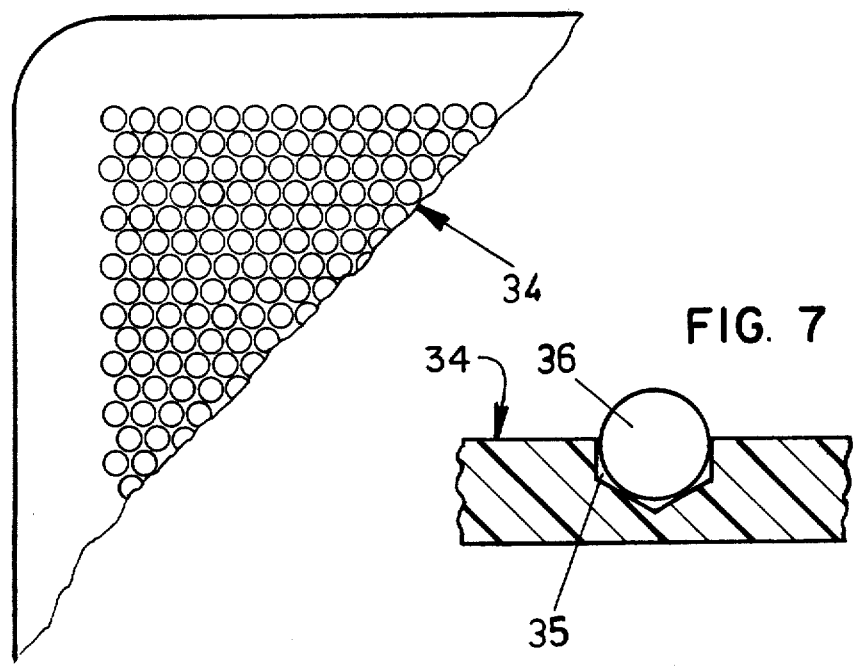
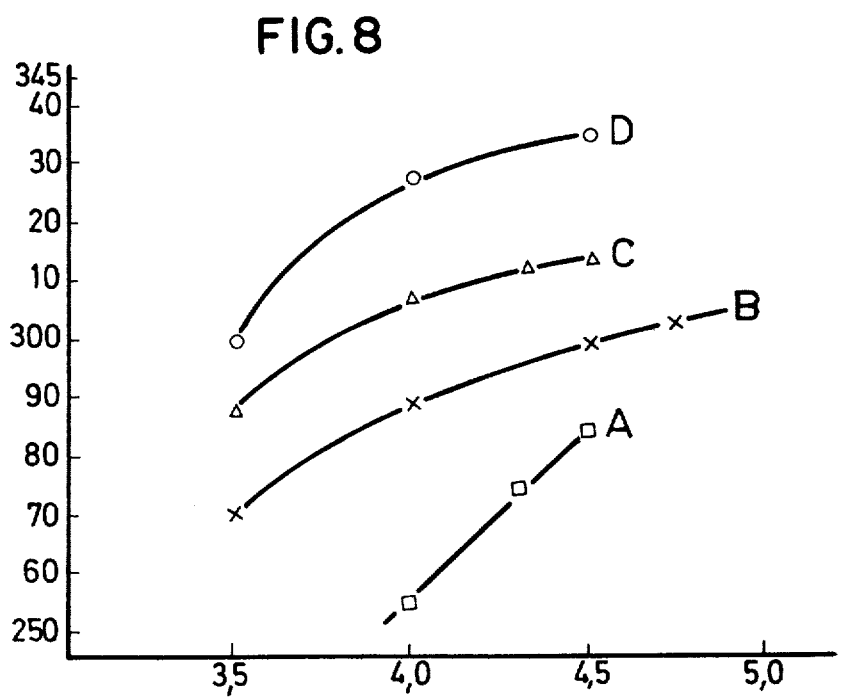

PROCESS AND DEVICE FOR THE MANUFACTURE OF BLISTERS WITH HIGH BARRIER PROPERTIES

BACKGROUND OF THE INVENTION

The invention presented here relates to a process and device for manufacturing blisters with high barrier properties from a metal-plastic composite foil which can be deep drawn, in particular from an aluminum-plastic composite foil which is held fast in the clamping facility of a device for manufacturing blisters.

The non-uniform stressing of a metal-plastic foil during deep drawing results in the deep drawing ratio in the process as practiced to date being adjusted to accommodate the critical radial region i.e. the ratio is, to disadvantage, reduced.

What is known, for example from the German Pat. No. 2 321 980, is a device for forming cup-like recesses in thin aluminumplastic strip using a shape giving plunger, die and a clamping facility which holds the strip on the die and a thin layer of material of low friction characteristics on the shaping surface of the plunger, the purpose of which is basically to prevent tears forming in the aluminum-plastic composite and to prevent the composite from being subjected to relatively large frictional forces during the deep drawing process. The frictional forces which arise in this process do not, however, depend solely on the layer on the plunger, but also on the coefficients of friction of the metal-plastic foil. When the blisters are to contain foodstuffs or pharmaceuticals, special lubricants are often not permitted on the inside and therefore small changes in the surface of the metal-plastic composite can lead to variable deep drawing behavior or to interruptions in production.

Also known, for example from the German Pat. No. 2 539 354, is a process and device for manufacturing lightweight containers out of a foil of metal, plastic or preferably a metal-plastic composite, whereby the foil is held fast at the edge of an opening and then stretched into the opening to form a cup shape. It is part of the process that the front of the plunger comes to rest in the radial inner region of the freely suspended part of the foil and stretches it to a preform with relatively gently sloping sidewall, and when, by advancing the plunger, one or progressively more shoulders of the plunger come into contact with the sloping sidewall and stretch the preform deeper and wider. With that process the blister is given a stepped sidewall or a very large radius between the sidewall and the base, which is not always desired and often makes it impossible for the blister to take on the particular shape of the contents.

When deep drawing metal-plastic composites, such as for example aluminum-plastic composites by elongation, these materials are particularly highly stressed in the region of the radii or in the zones of the numerous shoulders of the plunger between the base and the sidewall when using the abovementioned process and device. For this reason the deep drawing ratio cannot be increased. It should also be mentioned, in connection with the material of low friction properties in the German Pat. No. 2 321 980, that such a coating suffers to a relatively high degree from wear, and therefore continuous, trouble-free production with such plungers is not possible.

A further disadvantage of the above-mentioned processes and devices for carrying out such processes is that the base of a semi-rigid blister is subjected to no or only partial elongation or pre-stretching in the deep drawing process, and therefore in many cases relatively large basal areas of the blister were up to now only incompletely stretched, and therefore only relatively small deep drawing ratios were reached.

The object of the present invention is to develop a process and device for the manufacture of blisters from a metal-plastic composite which can be deep drawn, in particular from an aluminum-plastic composite by means of which, in particular in the case of relatively large basal areas, a larger deep drawing ratio and therefore larger volume of blister can be achieved than was possible up to now, and as a result of which the disadvantages associated with the above-mentioned processes and devices are avoided.

SUMMARY OF THE INVENTION

This object is achieved by way of the invention in that a process and a device for carrying out the process require the metal-plastic composite foil to be subjected to pneumatic or pneumatic and hydraulic pressure at least on one side for production of one or more blisters, and a lubricating layer or plate is provided at the base of a die, whereas said foil is elongated or stretched over said lubricating layer or plate.

The device for carrying out the process features a clamping facility which comprises one of two separable parts in which a metal-plastic composite foil can be clamped fast, whereby one part of the clamping facility is a pressure resistant plate and the other part a die with a base. The device is characterized by the combination of the following viz., that (a) the pressure resistant plate features at least one pressure supply line which is fitted with a closure and/or pressure reducing valve, is for supplying a gaseous medium and is connected to at least one closed chamber formed with the help of the foil held fast in the clamping facility, and (b) the base of the die is provided with a lubricating layer or easy slip plate.

Depending on the shape and size of the blister to be produced, it is possible, as desired, to provide the base of the die with a solid or liquid lubricating layer. In the case of a liquid lubricating layer the interior of the die is connected to a liquid supply system via a feed pipe fitted with a closure or pressure reducing valve. It is also possible, if desired, to have the easy sliding plate as a ball plate.

BRIEF DESCRIPTION OF THE DRAWINGS

Further advantages, features and details of the invention will now be revealed in the following description of peferred exemplified embodiments, which are illustrated in a simplified form with the help of drawings showing only one shaping tool over the whole breadth of the device, although a plurality of shaping tools can be arranged over the whole breadth of the device:

FIG. 6: A part of a plan view of a ball plate fitted to the base of a die to promote easy slip there.

FIG. 7: A section through part of the ball plate shown in FIG. 6, from which the arrangement of the balls in the plate can be seen.

Finally, the diagram of FIG. 8 shows, by way of comparison with results obtained by deep drawing processes known up to now, the advantageous possibilities for achieving better deformation of metal-plastic composite foils. This shows with curve A the volume achieved by conventional deep drawing, curve B the volume achieved by the process of the invention with the use of a solid slide plate (anti-friction) at the base of a die, curve C the volume achieved by the process of the invention with a ball plate in position on the base of the die, and curve D the volume which can be achieved using a lubricant (liquid) on the base of the die of the device.

DETAILED DESCRIPTION

Figure 1:
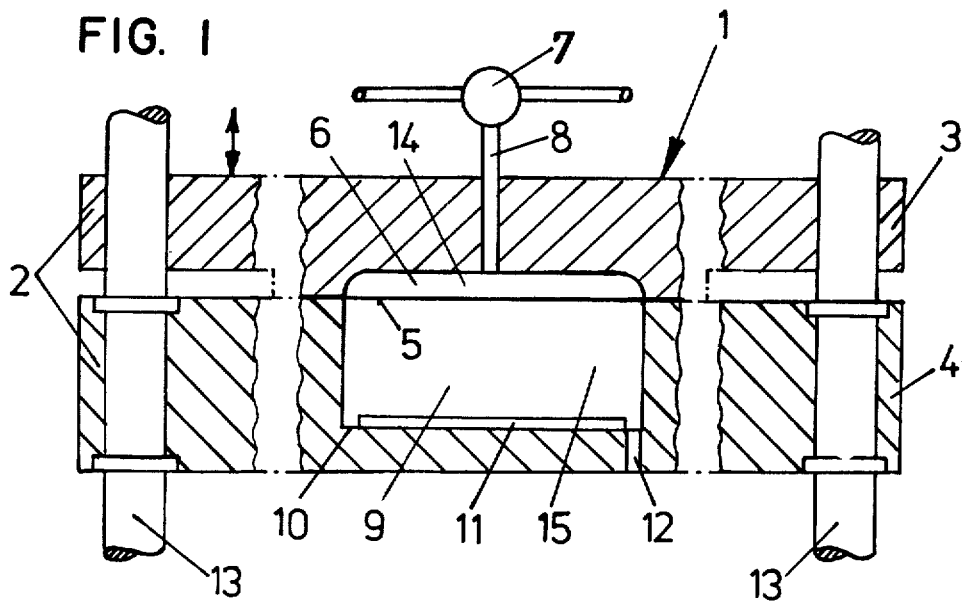
FIG. 1: A cross section through a first exemplified embodiment of the device showing a clamping facility between two parts of which a metalplastic composite foil is firmly clamped, and showing too a clamping plate with a trough-shaped recess connected to a pressure supply line, and a die with a solid lubricating layer provided on its base.
Figure 2:
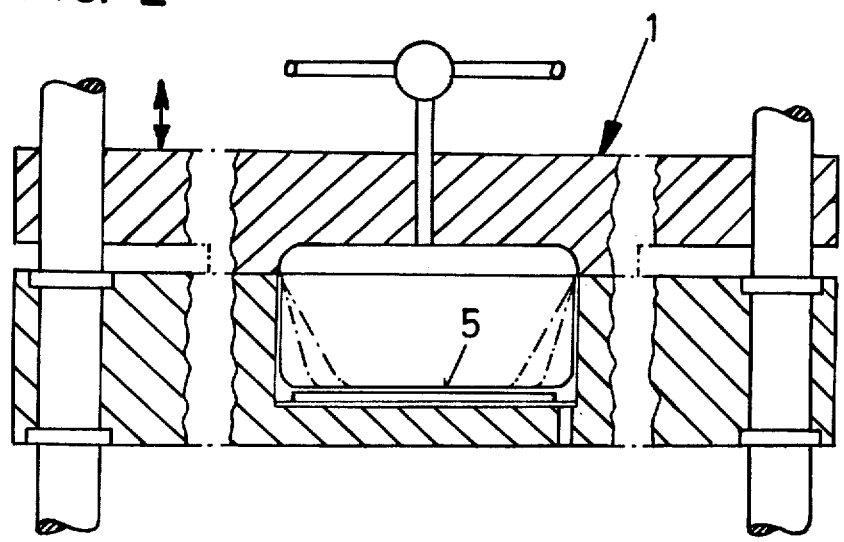
FIG. 2: A section through the device in FIG. 1 however with a foil shaped, by the application of a gaseous medium under pressure, to form a blister, and showing too various stages of deformation of the foil during the production of the blister.

In the case of the first exemplified embodiment shown in FIGS. 1 and 2 the device 1 features a clamping facility 2 which comprises two separable parts viz., a clamping plate 3 and a die 4 between which a metal-plastic composite foil 5 is clamped fast.

The clamping plate 3 is provided with a trough-shaped recess 6 which is connected up to a supply line 8 for supplying a gaseous medium at pressure via a closure and pressure regulating valve 7. The die 4 also features a recess 9, which is shaped according to the desired shape of blister, and which has at the base 10 a lubricating plate 11. On the base 10 of the die 4 there is a hole 12 through which air can escape during the shaping process. It should also be pointed out in particular that both parts 3 and 4 of the clamping facility 2 are either permanently connected to a frame 13 or else such that they can be moved back and forward on the said frame 13, and also that the lubricating plate 11 is made of a known material such as Teflon or the like, or else can be in the form of a ball plate.

The foil 5 held firmly between the two parts 3 and 4 of the clamping facility 2 forms together with the recess 6 in plate 3 a chamber 14 and, together with the recess 9 in the die 4, a chamber 15.

In connection with the pressure supply line 8 on the clamping plate 3 it should be mentioned that a gaseous medium is supplied from a source not shown here via pipeline 8 to chamber 14 at a given pressure to shape the foil 5 into a blister form.

In the shaping process pressure is applied pneumatically to the side of the foil 5 facing chamber 14 and the foil 5 stretched into the trough-shaped recess 9 in the die 4. In doing so the foil 5 first takes on the shape of a segment of a sphere. At a later stage of the shaping process the segment of the sphere flattens out on the lubricating plate 11 and stretches smoothly out over the plate 11 until it takes on the form of a blister shown in FIG. 2.

In connection with the easy slip plate 11 mention should be made of a special version of this shown in FIGS. 6 and 7 where it is in the form of a ball plate 34 which can be positioned on base 10 of the die 4 of the device 1 as required.

The ball plate 34 is preferably made of plastic such as nylon for example. Holes 35 are provided in the plate 34 at a predetermined spacing, and in the holes there are balls 36 which can turn freely.

Figure 3:
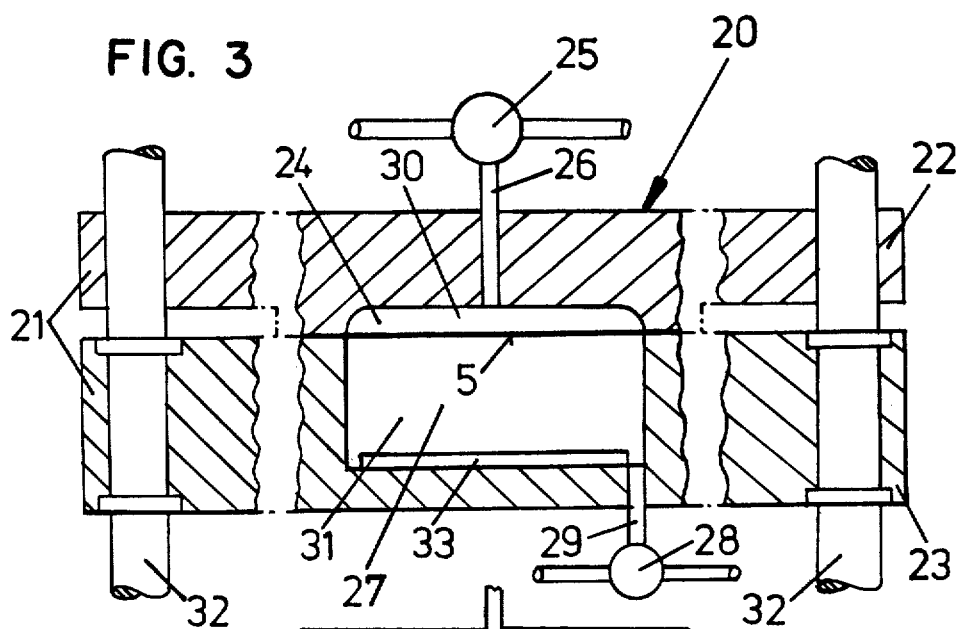
FIG. 3: A section through a second exemplified embodiment of the device showing a metal plastic composite foil held fast between a die and a trough-shaped recess in a clamping plate, and showing too a pressure supply line to the die and the clamping plate.
Figure 4:
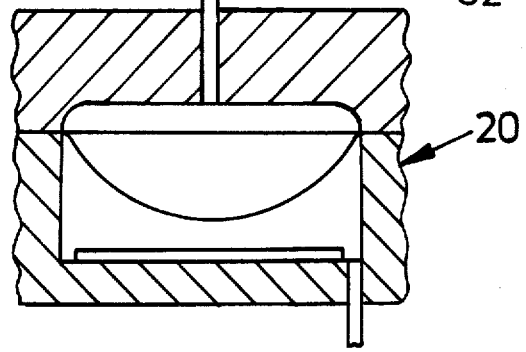
FIG. 4: The same device as in FIG. 3, shown in section, but with a foil partially shaped by application of pressure to both sides of the foil i.e. with a gaseous medium and with a liquid medium.
Figure 5:
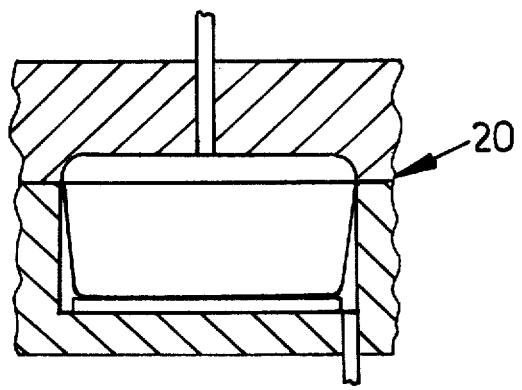
FIG. 5: The same device as shown in FIGS. 3 and 4, but showing a foil which has been shaped into a blister.

In the case of the second exemplified embodiment shown in FIGS. 3, 4 and 5, the device 20 features a clamping device 21 which, as with the clamping device 2 of the version shown in FIGS. 1 and 2, comprises two separable parts viz., a die 23 and a clamping plate 22 between which a metal-plastic composite foil 5 is firmly clamped.

The clamping plate 22 is provided with a trough-shaped recess 24 which is connected to a pressure supply line 26 for supplying a gaseous medium via a closure and pressure regulating valve 25. The die 23 likewise features a trough-shaped recess 27 which has the shape desired of the blister and is connected to a pressure supply line 29 for supplying a liquid medium via a closure and pressure reducing valve 28.

A foil 5, clamped firmly in the clamping facility 21, forms a chamber 30 together with the trough-shaped recess 24 in the plate 22 and another chamber 31 together with the recess 27 in the die 23. It should also be mentioned that both parts 22 and 23 of the clamping device 21 are connected to a frame 32 either permanently or such that they can move back and forwards on the said frame 32.

The pressure supply line 26 connected up to the clamping plate 22 and the supply line 29 connected to the die 23 are connected to pneumatic and hydraulic pressure sources respectively, not shown here.

The shaping of the metal-plastic foil 5 to a blister is achieved with the aid of the device 20 in such a way that the foil 5 is simultaneously acted on pnematically from chamber 30 and hydraulically from chamber 31, the pressure in chamber 30 being higher than that in chamber 31, as a result of which the foil 5 extends down into the recess 27 in the die 23 on to the lubricating layer on the base 33 on which it stretches smoothly into the final form of the blister, as illustrated in FIG. 5.

The invention is not limited to the embodiments described here. Other versions within the scope of the invention but not described here are also conceivable.

Using the process of the invention and the device for carrying out the process one obtains, to advantage, in the case of blisters with a relatively large basal area, and using one and the same metal-plastic composite foil, a more favorable deep drawing ratio, i.e. greater blister depths and smaller radii and therefore larger volumes than has been obtainable up to now.

The process of the invention is, usefully, not limited for example to certain contours of the shaping tool. The metalplastic composite foil can be shaped to a blister form closely matching that of the contents so that no undesirable dead space is created in the package. The process and device for carrying out the process lend themselves particularly well to the manufacture of blister placks with high barrier properties.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. Device for manufacturing blisters from metal-plastic composite foil which comprises a clamping facility including two separable parts between which a metal-plastic composite foil is firmly clamped, one part of which is a pressure resistant plate and the other part of which is a die having a base and a recess therein corresponding to the desired blister shape, wherein said pressure resistant plate includes at least one pressure supply line for supplying a fluid medium thereto for deforming said foil into said recess, said line connected to a closed chamber formed with the help of the foil held fast in the clamping facility, and said die being provided with a lubricating layer in the base thereof so that said foil is smoothly elongated or stretched into said recess and over said lubricating layer thereby obtaining improved blister volume and larger drawing ratio.

2. A device according to claim 1 wherein the lubricating layer is solid.

3. A device according to claim 1 wherein the lubricating layer is an easy slip plate.

4. A device according to claim 1 wherein the lubricating layer is liquid.

5. A device according to claim 1 wherein said die includes a trough-shaped recess therein, with said recess being connected to a hydraulic pressure system via a supply line for supplying a liquid medium, and wherein said pressure resistant plate includes a supply line for supplying a gaseous medium at a higher level than said liquid medium so that said foil is simultaneously acted on by a gaseous medium from the pressure resistant plate and a liquid medium from said die.

6. Device for manufacturing blisters from metal-plastic composite foil which comprises a clamping facility including two separable parts between which a metal-plastic composite foil is firmly clamped, one part of which is a pressure resistant plate and the other part of which is a die with a base, wherein said pressure resistant plate includes at least one pressure supply line for supplying a gaseous or gaseous and liquid medium thereto and connected to at least one closed chamber formed with the help of the foil held fast in the clamping facility, and said die being provided with a lubricating layer in the base thereof, wherein said layer is an easy slip plate which comprises a plastic plate with holes spaced apart at a predetermined distance and containing balls which can rotate freely.

7. A device according to claim 1 wherein said pressure supply line is fitted with a closure or pressure reducing valve.

8. A device according to claim 5 wherein the supply line to the die is fitted with a closure or pressure reducing valve.

9. A device according to claim 1 wherein both said pressure resistant plate and die include recessed therein with said metal-plastic composite being clamped therebetween, so that said composite is shaped into a blister by deformation into the recess in said die over the lubricating layer.

10. Process for manufacturing blisters with high barrier properties from metal-plastic composite foil which can be deep drawn or stretched, which comprises holding said foil fast in a clamping facility including a recess corresponding to the desired blister shape and having a lubricating layer in the base thereof, said clamping facility also including a chamber opposed to said recess and closed in part by said foil, shaping said foil into said recess by the application of fluid pressure to said foil by a pressure supply line connected to said chamber, and elongating or stretching said foil into said recess and over said lubricating layer so that said foil is smoothly elongated or stretched into said recess and over the lubricating layer thereby obtaining improved blister volume and large drawing ratio.

11. A process according to claim 10 wherein said foil is an aluminum-plastic composite.

12. A process according to claim 10 wherein said clamping facility includes a pressure resistant plate and a die, both of which include recesses therein, with said composite clamped therebetween, wherein said composite is shaped into a blister by deformation into the recess in said die.

13. A process according to claim 10 wherein said lubricating layer is solid.

14. A process according to claim 10 wherein said lubricating layer is an easy slip plate.

15. A process according to claim 10 wherein the foil is shaped into said recess by the application of gaseous pressure, and including the application of hydraulic pressure to the side of the foil opposed to said gaseous pressure so that said foil is simultaneously acted on pneumatically and hydraulically, wherein said gaseous pressure is higher than said hydraulic pressure.

16. Process for manufacturing blisters with high barrier properties from metal-plastic composite foil which can be deep drawn or stretched, which comprises holding said foil fast in a clamping facility including a recess having a lubricating layer in the base thereof, said lubricating layer comprising an easy slip plastic plate containing freely rotating balls, shaping said foil by the application of gaseous pressure or gaseous and liquid pressure to at least one side of the said foil, and elongating or stretching said foil into said recess and over said freely rotating balls.

* * * * *